United States Patent
Spencer et al.

(10) Patent No.: US 7,445,264 B2
(45) Date of Patent: Nov. 4, 2008

(54) COVER SYSTEM FOR TRUCK BOX

(75) Inventors: Michael R. Spencer, Hubbard, NE (US); Jerry R. Dimmer, Yankton, SD (US)

(73) Assignee: Truxedo, Inc., Yankton, SD (US)

(*) Notice: Subject to any disclaimer, the term of this patent is extended or adjusted under 35 U.S.C. 154(b) by 0 days.

(21) Appl. No.: 10/731,898

(22) Filed: Dec. 9, 2003

(65) Prior Publication Data

US 2004/0212212 A1 Oct. 28, 2004

Related U.S. Application Data

(63) Continuation-in-part of application No. 10/422,311, filed on Apr. 24, 2003, now abandoned, which is a continuation of application No. 10/001,384, filed on Oct. 31, 2001, now Pat. No. 6,568,740.

(51) Int. Cl.
*B60P 7/04* (2006.01)

(52) U.S. Cl. .............. 296/100.16; 296/100.15; 296/100.18

(58) Field of Classification Search ............. 296/100.01, 296/100.11–100.16, 98
See application file for complete search history.

(56) References Cited

U.S. PATENT DOCUMENTS

| | | | |
|---|---|---|---|
| 4,036,521 A | 7/1977 | Clenet | |
| 4,496,184 A * | 1/1985 | Byrd et al. | 296/100.15 |
| 4,739,528 A | 4/1988 | Allen | |
| 4,991,640 A | 2/1991 | Verkindt et al. | |
| 5,076,338 A | 12/1991 | Schmeichel et al. | |
| 5,174,353 A | 12/1992 | Schmeichel et al. | |
| 5,251,951 A | 10/1993 | Wheatley et al. | |
| 5,261,719 A * | 11/1993 | Tucker | 296/100.18 |
| 5,365,994 A | 11/1994 | Wheatley et al. | |
| 5,522,635 A * | 6/1996 | Downey | 296/100.16 |
| 5,788,315 A | 8/1998 | Tucker | |
| 5,906,407 A | 5/1999 | Schmeichel | |
| 5,984,400 A * | 11/1999 | Miller et al. | 296/100.15 |
| 6,234,561 B1 | 5/2001 | Huotari | |
| 6,257,647 B1 | 7/2001 | Ninnes et al. | |
| 6,293,608 B1 | 9/2001 | Dicke et al. | |
| 6,322,129 B2 | 11/2001 | Huotari | |

(Continued)

OTHER PUBLICATIONS dictionary.com definition results for "slat".*

(Continued)

*Primary Examiner*—D. Glenn Dayoan
*Assistant Examiner*—Greg Blankenship
(74) *Attorney, Agent, or Firm*—Jones Day

(57) ABSTRACT

A fastening system for a flexible cover system for a truck box includes a first fastening means on the side edges of the flexible cover and a second fastening means that releasably engages with the first fastening means. The second fastening means comprises a fastening surface disposed on an elongated slat, and is slidingly received in channel portions of side rails mounted on the side of the truck box. The first fastening means can be one member of a hook and loop type fastener and the second fastening surface can be the mating member of the hook and loop type fastener. The elongated slat may also be shorter than the channel portions of the side rail to permit the slat to slide within the channel during operation of the cover system.

30 Claims, 8 Drawing Sheets

U.S. PATENT DOCUMENTS

| | | | |
|---|---|---|---|
| 6,386,616 B1 * | 5/2002 | Wheatley | 296/100.16 |
| 6,431,634 B1 | 8/2002 | Ananian | |
| 6,543,835 B2 | 4/2003 | Schmeichel et al. | |
| 6,568,740 B1 | 5/2003 | Dimmer | |
| 6,669,264 B1 * | 12/2003 | Tucker | 296/100.15 |
| 6,808,220 B2 * | 10/2004 | Wheatley | 296/100.15 |
| 2002/0093216 A1 | 7/2002 | Ananian | |
| 2002/0096268 A1 | 7/2002 | Schmeichel et al. | |
| 2003/0197394 A1 | 10/2003 | Dimmer | |

OTHER PUBLICATIONS

Velcro USA Inc., Product Information Guide for "Soft Hardware Fasteners" (2 pages), Dec. 1999, United States.

Photographs (8 total) of fastening system by Land Industries, Inc.

* cited by examiner

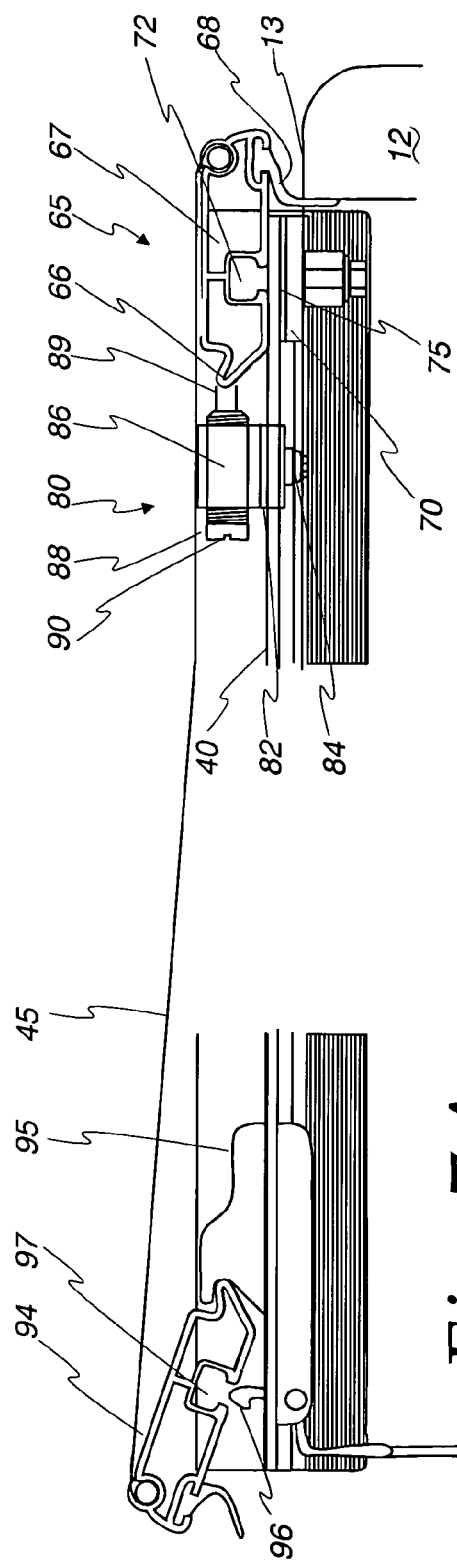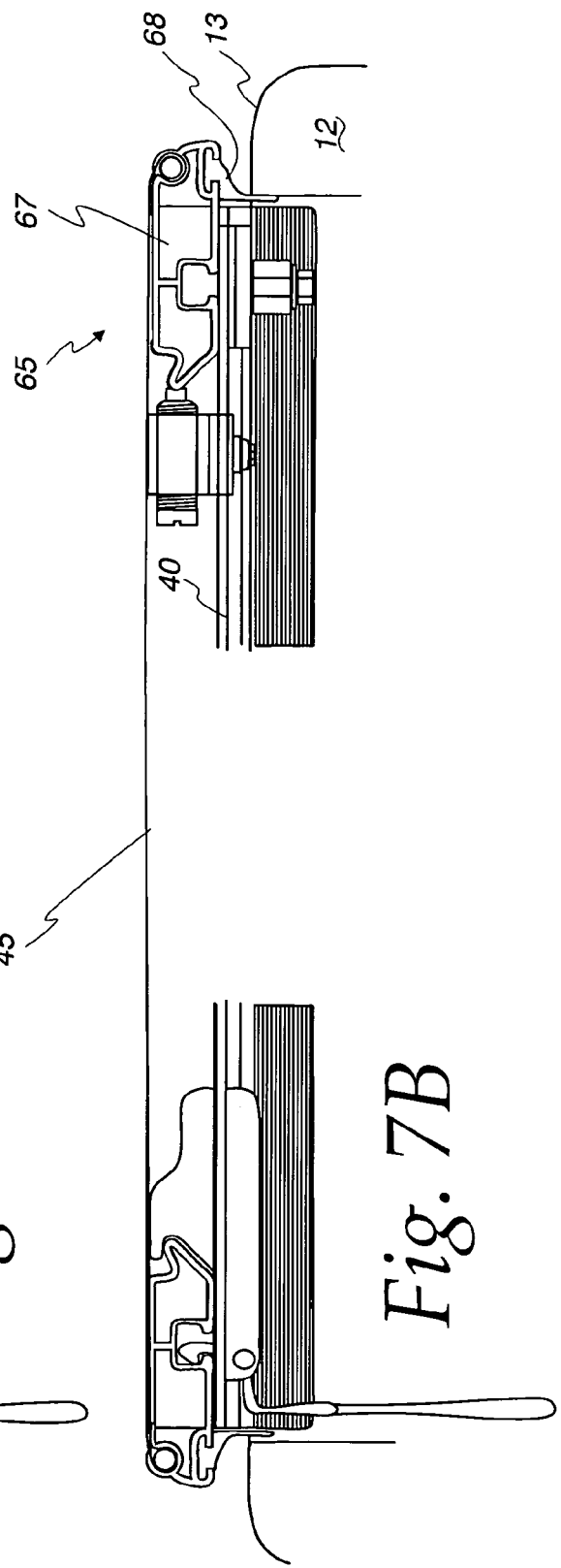
Fig. 7A
Fig. 7B

COVER SYSTEM FOR TRUCK BOX

CROSS REFERENCE TO RELATED APPLICATIONS

This application is a continuation-in-part of U.S. patent application Ser. No. 10/422,311, filed Apr. 24, 2003, now abandoned, which is a continuation of U.S. patent application Ser. No. 10/001,384, filed Oct. 31, 2001, now U.S. Pat. No. 6,568,740, the disclosures of all of which are hereby incorporated by reference as if set forth fully herein.

BACKGROUND OF THE INVENTION

This invention relates to a cover system for an open compartment. In particular, the invention relates to a cover system suitable for covering the open box, or cargo compartment, of a pick-up truck.

It is known in the art to provide a cover made of a flexible material and adapted to cover the box of a pick-up truck or the like, to protect the contents thereof from the elements. Such a cover can be made of fabric, flexible plastic, or other sheet material. The cover is commonly secured to a metal frame on the edge of the box with a method of reversible attachment. Because pick-up trucks typically are used and stored outdoors, the fabric and the means of attachment of the fabric to the frame are exposed to the elements which can include heavy moisture and extreme heat and cold, as well as dust, mud, rocks and other materials transported in the box.

The exposure to the elements creates problems for the covering and the structure used to reversibly attach the cover to the frame. Efforts to use convenient structures for attaching the cover to the metal structure tend to be subject to exposure to the elements and wear from repetitive use of the attachment means under those conditions. Moreover, exposure to heat and cold cause the covering to expand and contract, making the cover either loose and wrinkled in appearance, or making it difficult to secure the covering in the closed position.

A prior art attachment design for convenient reversible attachment of the covering to the frame uses a hook and loop fastening system sold under the trademark VELCRO®. In this system, strips of hook-bearing material are adhesively attached to a metal frame secured to the upper edges of the side of the truck box. Strips of loop-bearing material are permanently affixed to the downwardly facing surface of the cover material at its side edges opposite the metal frame. When the cover material is aligned over the truck box, and the strips of loop-bearing material on the downwardly facing side edges of the cover are pressed into contact with the strips of hook-bearing material adhesively fixed to the outer walls of the frame, such that a reversible yet secure mating is obtained. Although this system works well when first installed, it suffers from deterioration over time due to the repetitive pulling on the VELCRO® material attached to the frame in a direction away from the frame, particularly because it also is exposed to the elements. Specifically, the adhesive that attaches the hook-bearing strips to the frame will deteriorate over time because of the pulling motion which occurs when the cover is detached from the frame, and because of exposure to sun, moisture, and extreme temperature fluctuations. Moreover, heat or cold can cause the length and width dimensions of the cover and the frame to expand and contract, causing stresses in the adhesive bond of the VELCRO® material to the frame even when the cover is secured over the box.

Prior art cover systems employing the foregoing reversible attachment design also suffer from a problem associated with premature engagement of the hook and loop-bearing material attached to the frame and flexible cover, respectively. Premature engagement occurs in the prior art systems because as the user of the system unrolls the cover over the metal frame secured to the upper edges of the sides of a truck box or other open top container, the loop-bearing material attached to the downwardly facing surface of the cover material may engage the hook-bearing material attached to the metal frame at various points prior to the cover material being stretch taut. As a result, wrinkles may appear in the flexible cover material following closure of the cover system. To remove the wrinkles, the user is required to manually detach the strips of hook and loop-bearing material after the cover is stretched taut and then reattach them in a position that removes the wrinkles from the flexible cover.

It is thus one object of the invention to provide an attachment system for use with a cover for a truck box that provides a reversible yet secure attachment of the cover to the box, but will be resistant to deterioration as a result of repeated removal of the cover from the frame and exposure to the elements.

It is still another object of the invention to provide an attachment system for use with a cover for a truck box that provides an easily attachable and detachable covering without the prior art disadvantages of deterioration over time as a result of stresses applied during use.

In yet another aspect of the invention it is an object to provide a rail system for a cover system that minimizes, and preferably eliminates, the wrinkle problem associated with engagement of the fastening strips prior to the cover being fully closed and stretched taut.

SUMMARY OF THE INVENTION

In one inventive aspect of the disclosed subject matter, a cover system for a truck box or open top container is provided comprising a flexible cover material of approximately the same dimensions as the opening of the truck box or container, the flexible cover material having first fastening means in the form of strips of loop-bearing material fixedly attached at its sides, side rails capable of being mounted generally along the upper edges of the side walls of the truck box, each said side rail having an outwardly facing surface defining a channel portion, and second fastening means being in the form of substantially rigid strip members having strips of hook-bearing material bonded thereto, said substantially rigid strip members being receivable in longitudinally sliding engagement in said channel portions of said side rails, and obstructed from sliding out.

The foregoing system eliminates the adhesive mounting of the second fastening means directly to the frame at the edge of the truck box, as in prior art systems. By eliminating the adhesive holding one portion of the hook and loop fasteners to the frame, the instant invention eliminates wear problems associated with the repeated force of separating the hook portion from the loop portion of the connectors, and with poor initial and long term adhesion and weathering.

Another inventive feature of the disclosed cover system for an open top container or truck box comprises a flexible cover of approximately the same dimensions as the container or truck box, said flexible cover having a front edge and a rear edge, said front edge of said flexible cover being affixed to a front header apparatus, said front header apparatus spanning the width of said truck box or open top container and being adjustably mounted at the front end thereof, said rear edge of said flexible cover being affixed to a rear header apparatus, said rear header apparatus spanning the width of said truck box or open top container and capable of being releasably secured to said rear end thereof, and an adjustable tension control assembly that provides a forwardly biased force against said front header apparatus to urge said front header toward the front of the truck box or open container so as to maintain said flexible cover material in a taut condition, or to relieve stress due to contraction of the cover.

In one embodiment, the side rails are in the form of aluminum or plastic/composite extrusions that provide channel portions to receive said second fastening means and support members for supporting said front header apparatus, said rear header apparatus, and said tension control assembly.

A rail assembly comprises a side rail capable of being mounted adjacent the top rim of a side wall of the open top container or truck box and a second fastening means comprising an elongated slat slideably mounted to the rail within a channel provided therein. The slat includes a fastening surface exposed through the channel. The rail assembly further comprises at least one stop limiting the range the slat can slide longitudinally back and forth in the channel. In one embodiment, the slat is shorter than the channel and the at least one stop is configured so that the slat slides within the channel without exiting the channel.

When the foregoing rail system is employed in a cover system for an open top container or truck box, certain advantages are achieved without significant loss of the strength of attachment to the cover. In particular, the foregoing rail system permits the slat forming the second fastening means to slide forward toward the front wall of the container or truck box and rearward toward the rear wall of the container or truck box a limited amount during use. This limited longitudinal movement permits the slat to slide during the closure operation. As a result, the wrinkle problem encountered in prior art systems is minimized, or even avoided altogether, when the rail system according to the present aspect of the invention is employed in a cover system for an open top container or truck box.

The above and other objects, features, and advantages of the present invention will become apparent from the following detailed description of the preferred embodiments of the various aspects of the invention.

DESCRIPTION OF THE FIGURES

The following detailed description of the invention can be better understood with reference to the accompanying drawings, wherein

FIG. 7A is a side cross-sectional view of the front header apparatus showing engagement by the tension control assembly before the rear header is locked in position;

FIG. 7B is a side cross-sectional view of the front header apparatus showing engagement by the tension control assembly after the rear header is locked in position;

DETAILED DESCRIPTION

Figure 1:
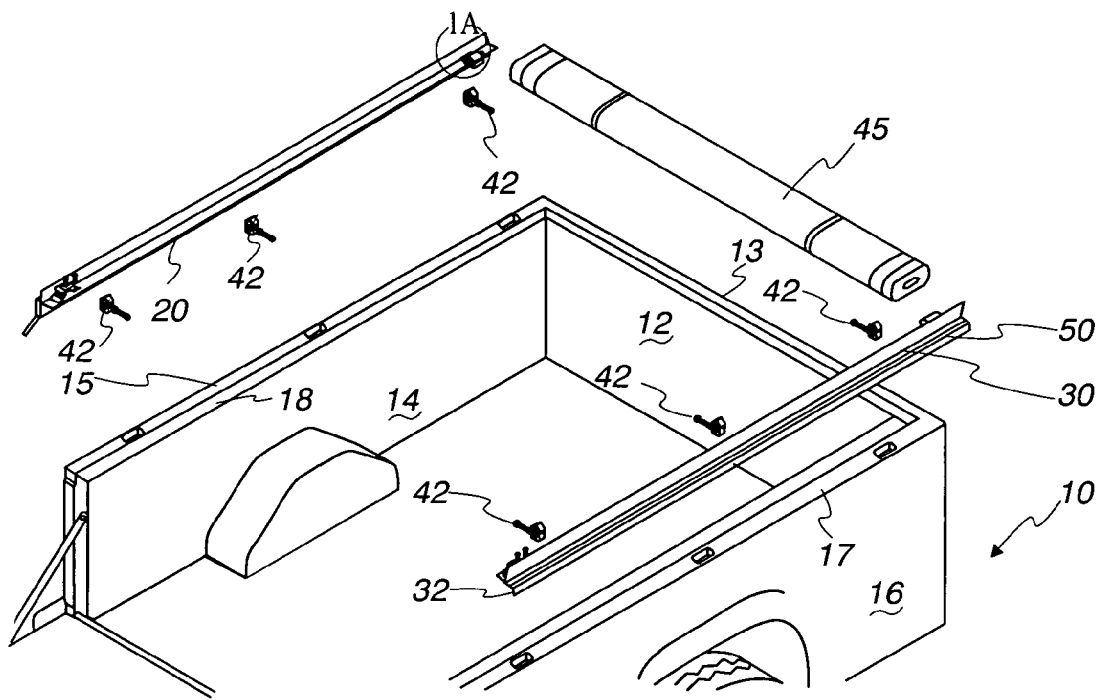
FIG. 1 is an exploded perspective view of a cover system in accordance with the instant invention, with the flexible cover and front and rear header illustrated in a rolled-up condition.
Figure 1A:
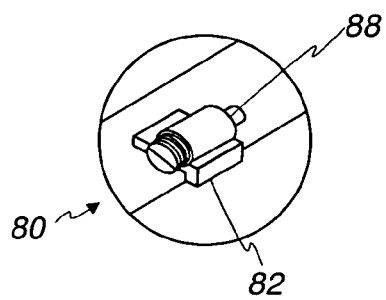
Figure 2:
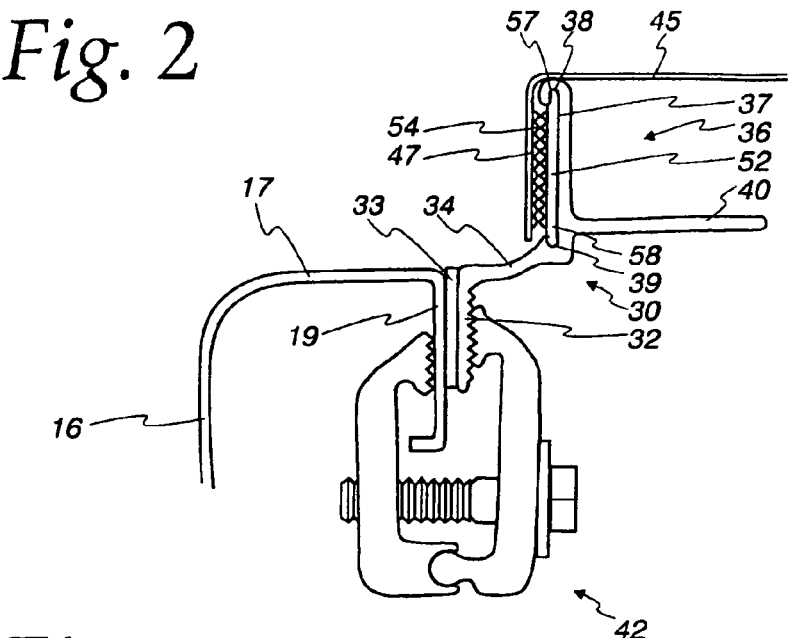
FIG. 2 is a side cross-sectional view of a side rail mounted on a rim of a truck box in accordance with the instant invention.

As illustrated in FIG. 1, a truck box 10, as is well-known in the art, comprises a front wall 12 having a top rim 13, and side walls 14, 16 having top rims 15, 17, said rims having inwardly facing downwardly extending lips 18, 19, respectively. Mounted on side wall top rims 15, 17 are side rails 20, 30, respectively. Side rail 30 will be described in detail, it being understood that side rail 20 is a substantially identical mirror image of side rail 30. As seen in FIG. 2, side rail 30 comprises vertical depending flange 32 of similar dimension to downwardly extending lip 19 and adapted to abut thereto. A resilient rubber or rubber-like seal 33 such as a strip of weatherproofing material can be disposed between downwardly extending lip 19 and vertical depending flange 32 to provide sealing and slip-resistant contact. While side rail 30 can be mounted to downwardly extending lip 19 of truck side wall 16 by known mechanical means such as bolts, rivets, screws, and the like, a preferred mounting means comprises a plurality of C-clamps, 42, which do not require holes to be drilled or punched in either lip 19 or side rail vertical flange 32.

Vertical depending flange 32 is connected by shoulder 34 to channel portion 36. Channel portion 36 comprises outwardly facing substantially flat surface 37, terminating at its upper longitudinal edge at curved surface 38 and terminating at its lower longitudinal edge at curved surface 39. The surfaces 37, 38, 39 together define a channel capable of receiving a member in the configuration of an elongated slat. Channel portion 36 is shown as substantially vertical, although it can also be in an inclined configuration. Extending inwardly from the lower inwardly facing surface of channel portion 36 is horizontal support flange 40, discussed in greater detail below.

Side rail 30 is preferably made by extrusion, and preferably is made of a strong, lightweight, rustproof material. Anodized aluminum has been found suitable for this purpose; certain strong plastics may also find utility herein.

FIG. 2 generally illustrates flexible cover material 45 having first fastening means 47 disposed along the downwardly facing side edges thereof. First fastening means 47 preferably comprises strips of loop bearing material permanently affixed to flexible cover material 45 by means such as stitching, adhesives, chemical bonding, fusion, and the like.

Figure 3:
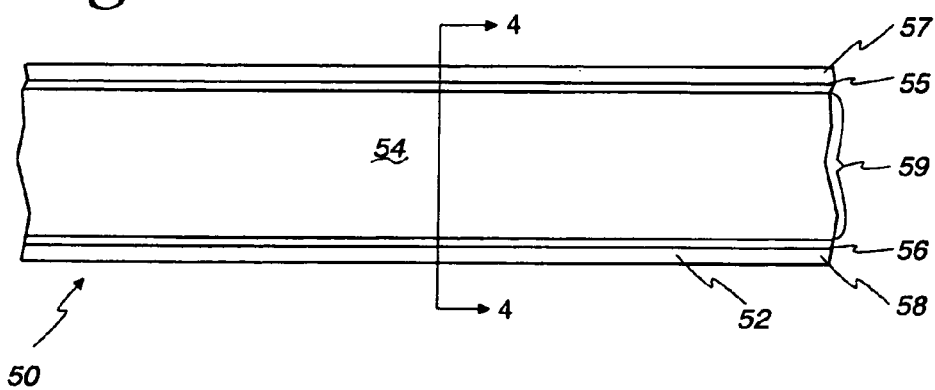
FIG. 3 is a front elevation view of a segment of a second fastening means capable of being mounted on a side rail of the instant invention.
Figure 4:
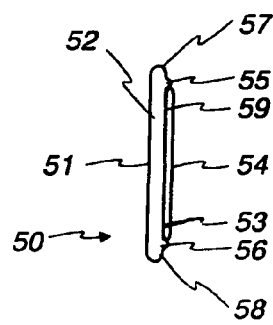
FIG. 4 is a view along line 4-4 of FIG. 3.
Figure 5:
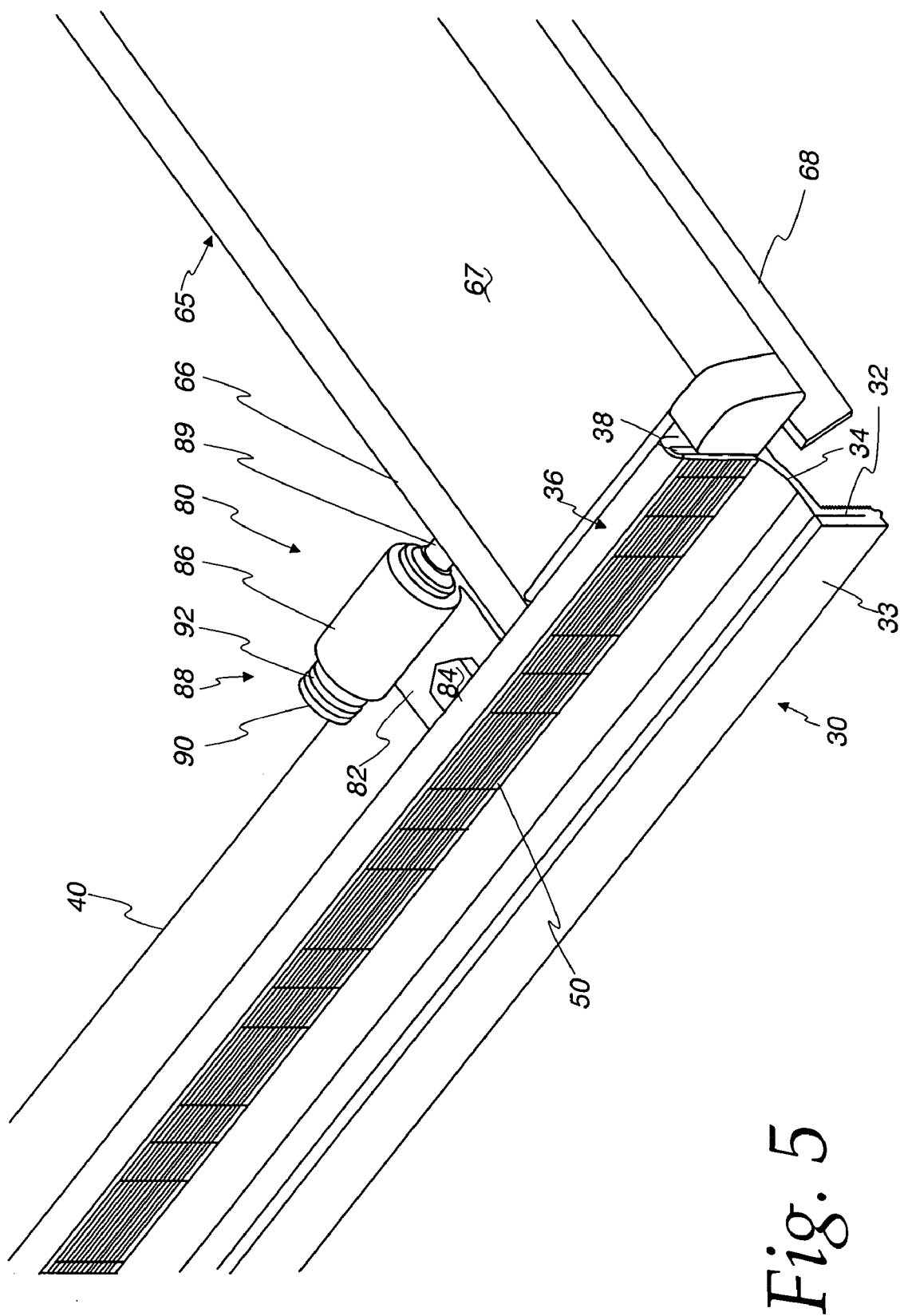
FIG. 5 is a perspective view of the right front corner of the cover system of the invention without the flexible cover, showing the side rail, the front header apparatus, and the tension control assembly.
Figure 6:
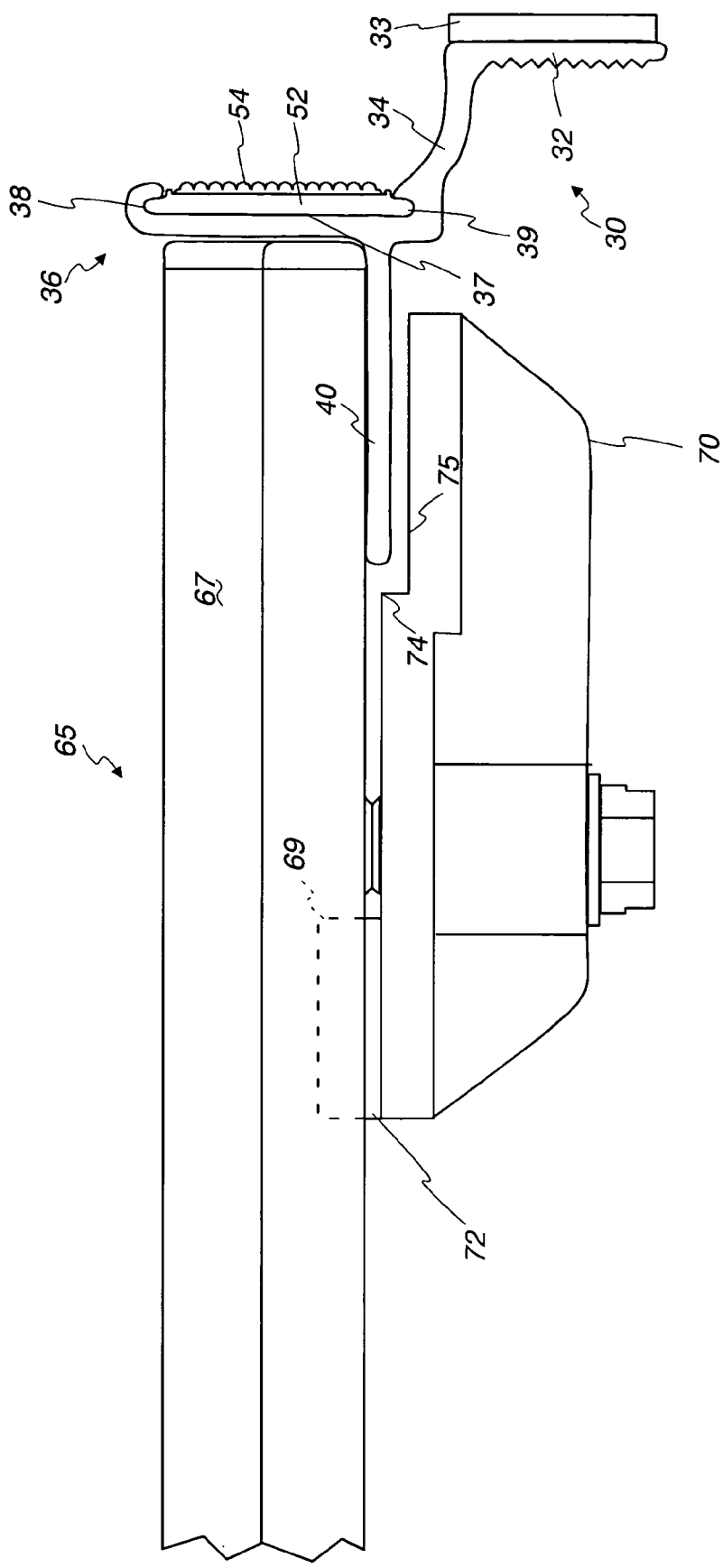
FIG. 6 is an elevation view of a front header apparatus showing the header guide with respect to the side rail.

Further in accordance with the invention, and as illustrated in FIGS. 3 and 4, second fastening means 50 comprises somewhat rigid elongated slats 52 having a rear surface 51 and a front surface 53. Integrally formed on front surface 53 are longitudinally extending ridges 55, 56 which define surface 53 into end shoulders 57, 58 and central slot 59. A strip of hook-bearing material 54 is permanently affixed to central slot 59, such as by adhesives, chemical bonding, thermal fusion, or the like. Elongated slats 52 are sized and dimensioned such that shoulders 57, 58 are received in sliding engagement by curved surfaces 38 and 39 of said channel portion 36. Somewhat rigid, elongated slats 52 already having hook-bearing material 54 permanently attached to a surface thereof are commercially available in roll-form from VELCRO USA. It is believed that resilient or rigid products having fastening hooks are sold by VELCRO USA under the trademark SOFT HARDWARE. Suitable lengths of second fastening means 50 are cut from the roll and slid into channel portions 36. If desired, the second fastening means 50 can be further secured within channel portion 36 by simple mechanical means such as a single pop-rivet disposed at about the longitudinal center of channel portion 36. In this manner, both second fastening means 50 and channel portion 36 can undergo expansion and contraction due to fluctuations in ambient temperature without warping, bending, or otherwise distorting the substantially flat configuration of second fastening means 50.

To use the cover system of the invention, the flexible cover material 45 starts in a rolled-up position adjacent front wall 12 of truck box 10 as shown in FIG. 1. A front header apparatus, discussed in greater detail below, connects the front edge of flexible material 45 to the top of front wall 12. The user unrolls the flexible cover material 45 from the front of the truck box to the rear of the truck box. The rear edge of the flexible material 45 is connected to a rear header apparatus that snaps into a locking mechanism at the rear of the truck box, as is known in the art. After the rear header apparatus is locked into place, the user simply presses first fastening means 47 located at the side edges of the downwardly facing surface of flexible material 45 against second fastening means 50. First fastening means 47 and second fastening means 50 will engage one another to provide a weatherproof seal without gaps that will protect the contents of truck box 10 from rain, wind, and blowing debris. To remove the cover, the rear header apparatus is unsnapped from the rear locking mechanism and the flexible cover material 45 is simply rolled up toward the front of the truck box. There is no need to detach first fastening means 47 from second fastening means 50 prior to rolling up flexible material 45. The rolling action of the flexible material 45 creates a lifting force that serves to detach first fastening means 47 from second fastening means 50 at the point at which the flexible material 45 is being rolled along its length. Advantageously, the fastening system of the instant invention maintains that portion of flexible material 45 that has not yet been rolled up in a taut condition. This facilitates rolling of the flexible material into a neat, tightly wound roll that is easily stored.

Although the invention has been described herein with the hook-bearing material mounted on the frame and the loop bearing material mounted on the flexible cover, the roles of the hook and loop bearing materials could be reversed and the system would achieve substantially the same effect.

Another aspect of the invention relates to a means for maintaining the flexible cover material in a taut condition when it is covering the truck box. The front edge of flexible material 45 is permanently affixed to front header apparatus 65, which extends substantially the full width of truck box 10. Front header apparatus 65 includes front header body 67 which is preferably made of a lightweight, strong, rustproof material such as aluminum or certain plastics. Anodized or painted aluminum is preferred. The front end of front header body 67 is provided with header seal 68, which can be made of a resilient rubber or rubber-like material such as weatherstripping material. Header seal 68 is sufficiently resilient to provide a constant seal between front header apparatus and top rim 13 of front wall 12 of truck box 10, as the position of front header body is longitudinally adjusted as discussed below. In the illustrated embodiment, the lateral edge areas of the bottom surface of front header body 67 rest on the top surface of support flanges 40 of side rails 20, 30. The bottom surface of front header body 67 is provided on each side with a header guide 70, only one of which will be described. Header guide 70 has on its top surface a protruding lug 72 which extends into cavity 69 on the bottom surface of front header body 67. The top surface of header guide 70 also has shoulder 74 that defines shelf 75, which fits underneath the bottom surface of support flange 40 of side rail 30. The header guides 70 on each side of front header body 67 thereby prevent front header apparatus 65 from slipping off support flanges 40, and further maintain front header body 67 in a substantially parallel position across truck box 10, even as the longitudinal position of front header body 67 is adjusted as discussed below.

A tension control assembly 80 is disposed behind each side of front header body 67. Only one such tension control assembly 80 will be described herein, it being understood that the other tension control assembly is essentially a mirror image. Tension control assembly 80 includes a bracket 82 fixedly mounted to support flange 40 of side rail 30 by means such as bolt 84. Bracket 82 includes internally threaded collar member 86 in which is mounted spring plunger 88. Bracket 82 and internally threaded collar member can be formed as separate elements, or can advantageously be formed as a one-piece extrusion. Spring plunger 88 comprises externally threaded cylinder 92, the threads of which mate with the internal threads of collar member 86. Seated within the rear end of threaded cylinder 92 is a spring (not shown) which at its forward end engages the rear of nose 89. The front of nose 89 engages rearward projection 66 extending from front header body 67. A slot 90 on the rear end of cylinder 92 receives a screwdriver for manual adjustments.

In operation, the cover system is unrolled and rear header 94, to which the rear edge of flexible material 45 is permanently affixed, is positioned over rear header stop 95. The user presses down on rear header 94 until toggle 96 is fully engaged within recess 97 on the underside of rear header 94. Rotation of rear header 94 during closing will pre-tension flexible cover 45 by means of spring plunger 88. With the cover completely closed, the flexible material 45 is constantly in tension, and spring plunger 88 provides a forwardly directed linear force to maintain the flexible material 45 in a taut condition. Spring plunger 88 is also manually adjustable by using a screw driver in slot 90 to turn externally threaded cylinder 92, to advance or retract spring plunger 88 to the needs and desires of a particular user. The tension also can be adjusted to accommodate expansion or contraction of the materials of the cover system in response to climactic conditions. As the tension is controlled by tension control assembly 80, either automatically by virtue of the inherent operation of spring plunger 88 or manually by adjustments as hereinbefore described, front header apparatus 65 will ride either slightly forward or slightly back along support flanges 40 to achieve the desired tension. In a preferred embodiment, each tension control assembly can effect adjustment by as much as 0.5 inch, and provides a force of up to 80 lbs. The two tension control assemblies on either side of the front header apparatus together provide a force of up to 160 lbs.

Figure 8:
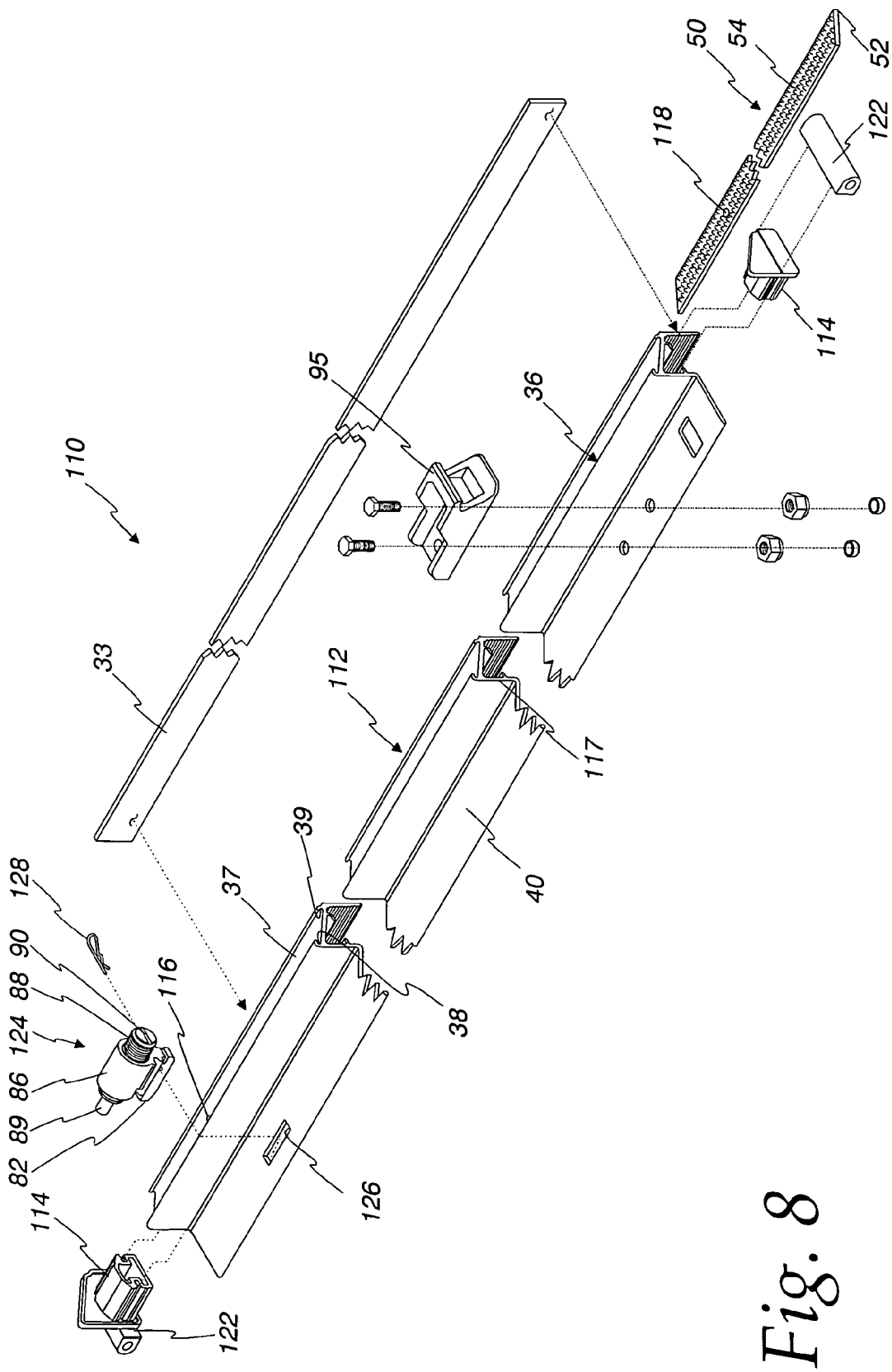
FIG. 8 is a partial exploded perspective view of an alternative embodiment of a rail assembly for use in cover systems according to the present invention.
Figure 9:
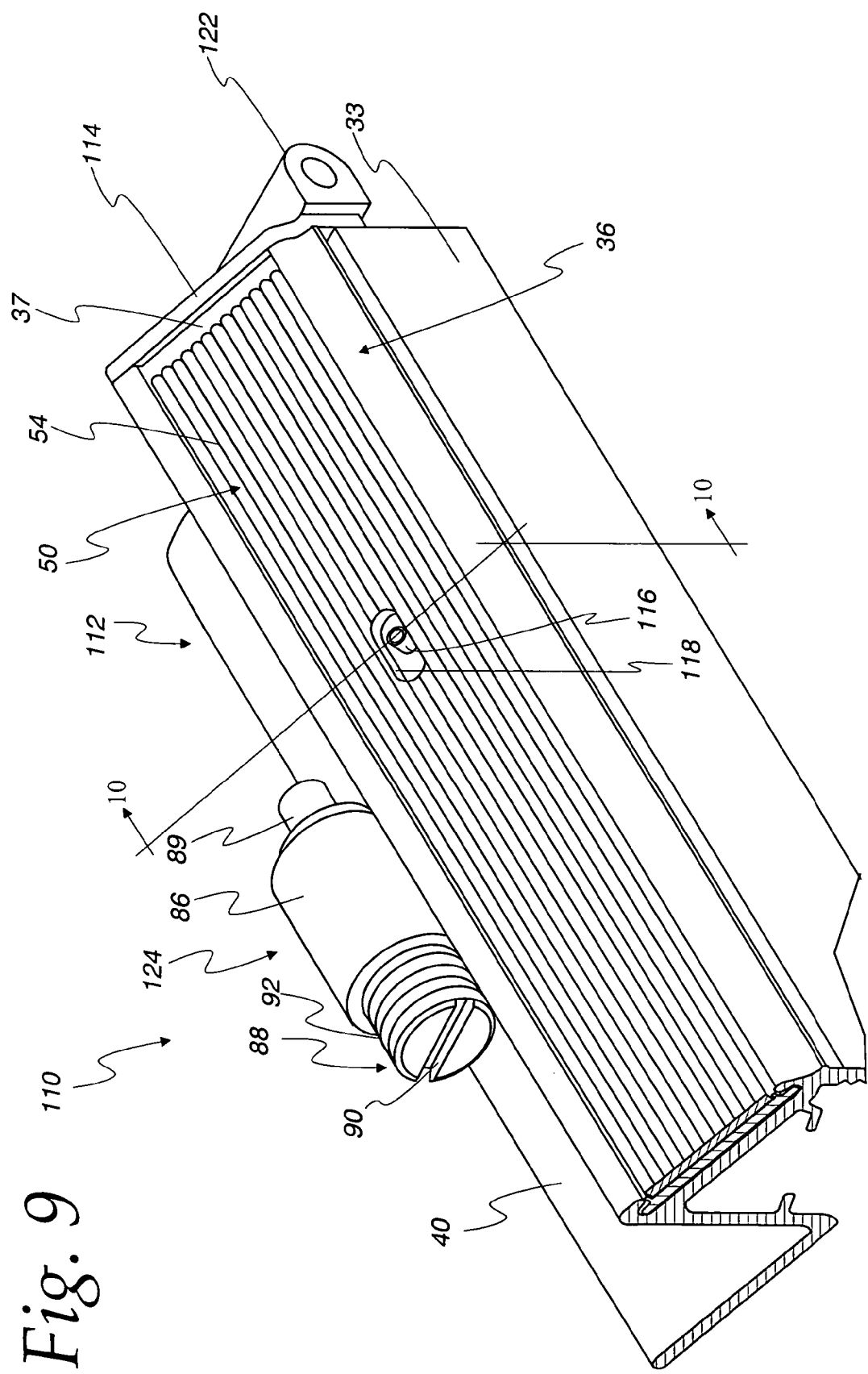
FIG. 9 is an enlarged perspective view of a front portion of the rail assembly shown in FIG. 8.
Figure 10:
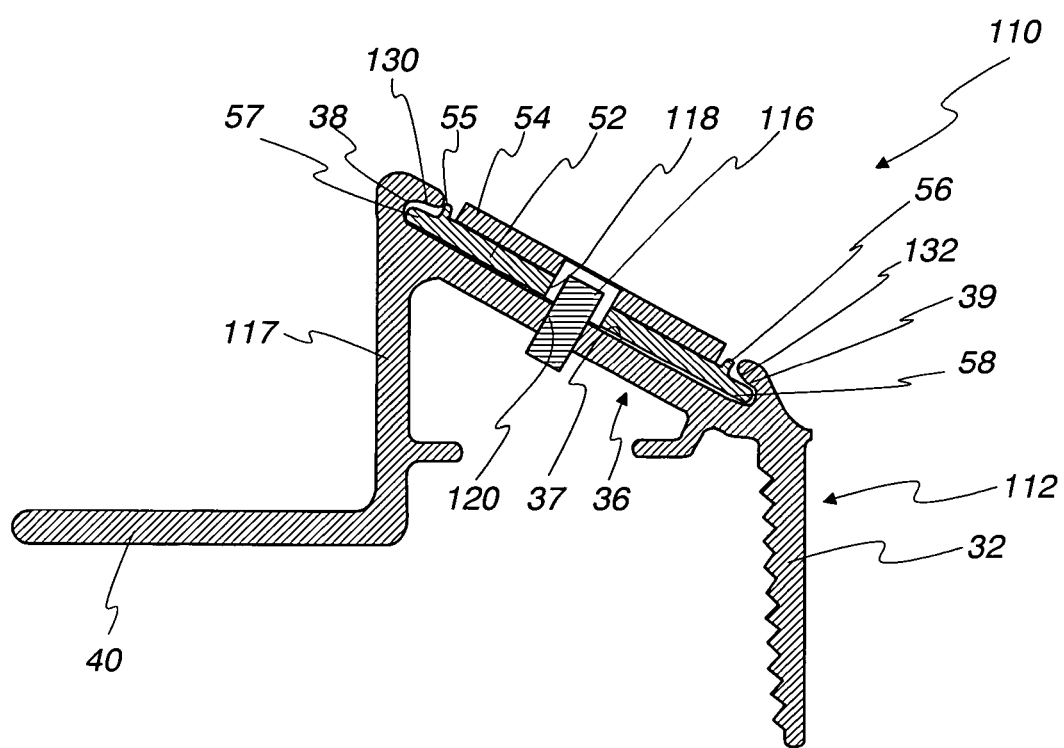
FIG. 10 is a cross-sectional view along line 10-10 of FIG. 9.

Another aspect of the invention is now described in connection with FIGS. 8-10. FIGS. 8-10 illustrate a rail assembly 110 for use in an alternative embodiment of a cover system according to the present invention. For convenience, therefore, like items have been referred to using the same reference numbers as used in connection with the description of the cover system shown in FIGS. 1-7.

The rail assembly 110 according to the illustrated embodiment comprises a side rail 112, second fastening means 50 slideably mounted within channel portion 36 of side rail 112, and at least one stop, such as end caps 114 or pin 116, for limiting the range the second fastening means can slide longitudinally within the channel portion 36. When used in a cover system according to the present invention, two rail assemblies 110 are preferably used, each being mounted to a top rim 15, 17 of opposite side walls 14, 16 of a truck box or open top container. The two rail assemblies in such circumstances are also preferably substantially identical mirror images of one another.

Side rail 112 is essentially an alternative embodiment of side rail 30 described in connection with FIGS. 1 and 2. Indeed, those skilled in the art will appreciate from the instant disclosure that the configuration of side rail 30 described above could also be used in the rail assembly 110 according to the present aspect of the invention. Like side rail 30, side rail 112 is capable of being mounted adjacent a top rim of a side wall of a open top container or truck box—such as top rim 17 of side wall 16 shown in FIGS. 1 and 2—using vertically depending flange 32. Moreover, side rail 112 includes a channel portion 36 comprising an outwardly facing surface 37 that terminates at its upper longitudinal edge at curved surface 38 and at its lower longitudinal edge at curved surface 39. In the present embodiment, however, vertically depending flange 32 is directly connected to channel portion 36 along its lower inwardly facing longitudinal edge and channel portion 36 is inclined as opposed to being substantially vertical. Moreover, at the upper longitudinal edge of side rail 112, a vertically depending wall 117 is provided from which horizontal support flange 40 extends.

While channel portion 36 is inclined in the illustrated embodiment, in other embodiments of side rail assembly 110, channel portion 36 may be substantially vertical or substantially horizontal.

Side rail 112 is preferably made by extrusion, and preferably is made of a strong, lightweight, and rustproof material. Anodized aluminum has been found suitable for this purpose. However, other metals and plastics having sufficient strength to carry out the intended functions of the side rail may also be used.

Second fastening means 50 comprises an elongated slat 52 slideably mounted to side rail 112 within the channel defined in the channel portion 36 by surfaces 37, 38, and 39. A fastening surface is provided in the front surface of the slat 52 so that the fastening surface is exposed through the channel for reversibly fastening to the first fastening means 47 included on flexible cover 45. In the present embodiment the fastening surface comprises a strip of hook-bearing material 54 permanently affixed to or integrally formed in the central slot 59 of slat 52. Those skilled in the art will appreciate, however, that in alternative embodiments other fastening surfaces could also be used. For example, a strip of loop-bearing material could be substituted for the strip of hook-bearing material 54.

Elongated slat 52 is dimensioned such that shoulders 57, 58 are received in sliding engagement by curved surfaces 38, 39 formed in the channel portion 36. The lips 130 and 132, defining the curved surfaces 38 and 39, respectively, prevent the slat 52 from escaping from the channel, while allowing the slat 52 to slide within the channel. In the rail assembly 112 according to the present embodiment of the invention, elongated slat 52 is also dimensioned so that it is shorter than the channel portion 36. As a result, elongated slat 52 is capable of being slid longitudinally forwards and backwards within the channel defined in the channel portion 36 without actually exiting the channel during use of rail assembly 112. In other implementations of rail assembly 112, it may be desirable to use a slat 52 that is the same length as, or even slightly longer than, the channel defined in channel portion 36. In such implementations, however, end caps 114 would need to be omitted, or, alternatively, their configuration would need to be altered so as to not block the ends of slat 52 from at least partially exiting the channel defined in channel portion 36.

Second fastening means 50 may also comprise a plurality of slats 52 that are collectively shorter than channel portion 36, such that each slat can move forwards or rearwards within the channel, independently of the other slats. Moreover, the individual slats can be connected by an elastomeric material, or they can be entirely disconnected from one another.

In the illustrated embodiment, pin 116 is used as a stop to limit the range over which elongated slat 52 can slide within channel portion 36. Pin 116 is affixed to channel portion 36 so as to extend through slot 118 formed in elongated slat 52. The longitudinal dimensions of slot 118 in combination with the diameter of pin 116 define the amount of longitudinal movement of slat 52 that is possible. If the amount of permitted longitudinal movement is too small, the intended benefits of the rail assembly 112 will not be filly achieved. Further, if the amount of permitted longitudinal movement is too great, a substantial side length of the cover will not be secured to the side rail, which may produce undesirable effects. For example, an excessive amount of wind or moisture may enter the cover system when the rail system is in use, disturbing the contents of the bed, creating an undesirable level of flapping or causing the flexible cover to at least partially detach from the side rail during use. Preferably, slot 118 and pin 116 are dimensioned so as to permit from greater than or equal to 3/16 inches to less than or equal to about 1 and ½ inches of movement or play. More preferably, slot 118 and pin 116 are dimensioned so as to permit from greater than or equal to 3/16 inches to less than or equal to about ¾ inches of movement or play. Most preferably, slot 118 and pin 116 are dimensioned to provide approximately ½ inch play.

Pin 116 preferably comprises a roll pin removably inserted into a mating hole 120 formed in the channel portion 36 of the side rail 112 and which is dimensioned to provide an interference fit. In alternative embodiments, pin 116 may be attached to side rail 112 in other means, including, for example, by welding, brazing, bolting, and threaded engagement. Preferably pin 116 is removably attached so as to permit elongated slat 52 to be easily replaced in the event its fastening surface becomes worn.

Other types of stops may also be used in the rail assembly 112 to limit the range elongated slat 52 can longitudinally slide within channel portion 36. For example, end caps 114 may be used as stops in alternative embodiments of rail assembly 112. Other configurations of stops will also become apparent to those skilled in the art from the instant disclosure.

Regardless of whether end caps 114 are used as stops, end caps 114 are preferably included on opposite ends of rail 112 to prevent sand, grit, or moisture from entering the channel or dirt and wind from getting beneath the cover system when flexible cover 45 is deployed. End caps 114 are preferably configured to form an interference fit with opposing ends of side rail 112. Moreover, end seals 122 may be employed to provide a seal between rail assembly 112 and the front wall 12 and rear wall (or tail gate) of the open top container or truck box to which rail assembly 110 is mounted. End seals 122 are preferably made of a resilient rubber or other elastomeric material.

Rail assembly 110 according to the present aspect of the invention also preferably includes a tension control assembly 124. With the exception of the manner in which tension control assembly 124 is mounted to support flange 40, tension control assembly 124 is the same as tension control assembly 80 and functions in the same manner. In tension control assembly 124, bracket 82 is adapted to fit within a mating slot 126 formed in support flange 40 of side rail 112. Bracket 82 is inserted through slot 126 so that spring plunger 88 is positioned above support flange 40. Tension control assembly 124 is then fixedly secured to support flange 40 by inserting clip 128 through a mating hole formed in bracket 82.

The rail assembly 110 shown in FIGS. 8-10 provides several advantages when employed in cover systems for open top containers and truck boxes according to the present invention. In particular, a certain amount of engagement between the fastening means may occur during the closure operation when the first fastening means 47 and second fastening means 50 are facing one another. Heretofore, any engagement prior to the flexible cover being stretched taut was considered premature and undesirable because it typically resulted in wrinkles appearing in the flexible cover upon being stretched taut for final closure. To remove those wrinkles, the user was required to manually detach the fastening means along each side rail on each side of the truck box, and then reattach the flexible cover. By contrast, with the rail assembly 110 according to the present aspect of the invention, slat 52 is free to slide forwards and backwards over a limited distance in channel portion 36; thus, slat 52 can slide during the closure operation. This feature of rail assembly 110 shown in FIGS. 8-10 advantageously reduces or eliminates the formation of wrinkles in flexible material 45 in the closed cover after the closure operation. As the user presses down on rear header 94 to engage toggle 96, and as the flexible material 45 begins to move towards the rear, the elongated slat 52 is permitted to move along the length of the channel portion 36, thus potentially eliminating the need of the user to manually detach and reattach the flexible material 45 along the length of side rail 112.

The sliding slat feature of the rail assembly 110 also allows the cover system to be more quickly closed while maintaining a relatively neat and wrinkle-free appearance. Further, it helps preserve the life of the fastening means by eliminating the need for excessive detachment by the user and by reducing wear resulting from shear forces that would otherwise be placed on the fastening means during engagement of the rear header 94 about the toggle 96. In addition, it permits the tension control assembly 124 to continue to function even once the fastening means are fully engaged. This is because the ability of the elongated slat 52 to slide forward and backward in channel portion 36 of side rail 112 also permits the front header 65 to continuously adjust its longitudinal position by action of tension control assembly 124. As a result, it is believed a more constant tension is maintained on flexible cover 45 in cover systems employing rail assemblies 110 according to the present aspect of the invention. This in turn keeps the cover taut, which will improve its appearance, despite wide temperature fluctuations. By contrast, if slat 52 is fixedly attached to the side rail or otherwise prevented from sliding in channel portion 36 upon assembly of the cover system, then front header 65 essentially becomes fixed in place upon engagement of the flexible material 45 to the fastening surface of slat 52 and thus is no longer capable of tightening cover 45 in the event of an increase in ambient temperatures.

The foregoing description of the preferred and alternative embodiments of the various aspects of the instant invention is intended by way of illustration and not by way of limitation. Other modification, adaptations, and equivalents as will be apparent to those of skill in the art are intended to be encompassed within the scope of the following claims.

We claim:

1. An improved cover system for an open top container or truck box, the open top container or truck box having a front wall, a rear wall, and two side walls, wherein at least one of the walls has a top edge, the system having a flexible cover material with dimensions approximately the same as the dimensions of the open top and an upwardly facing and a downwardly facing surface, a first fastening means disposed along at least a portion of at least one side edge of the downwardly facing surface of the flexible cover material, and a rail capable of being mounted adjacent the edge of the wall and having an outwardly facing portion defining an elongated channel portion, wherein the improvement comprises:

an elongated, substantially rigid second fastening means having an integrally formed fastening surface positioned to engage the first fastening means, the second fastening means being dimensioned to be capable of longitudinal slideable engagement with the channel and also dimensioned to be incapable of lateral movement from the channel, wherein the second fastening means is prevented from longitudinal escape from the channel by a rivet.

2. The cover system of claim 1 wherein two of the side walls have top edges and two of the side edges of the cover material have downwardly facing fastening means, and further comprising a second rail, wherein the two rails are capable of being mounted on the two top edges.

3. The cover system of claim 1 wherein the first fastening means and the fastening surface of the second fastening means are selected from the group consisting of loop bearing material and hook bearing material.

4. The cover system of claim 2 wherein the rails are made of materials selected from the group consisting of extruded aluminum and plastic.

5. The cover system of claim 2 wherein the side rails further comprise a mounting flange.

6. The cover system of claim 2 wherein the side rails are secured to the top edges by means selected from the group consisting of bolts, rivets, screws, and C-clamps.

7. The cover system of claim 1 wherein the channel is substantially vertical.

8. The cover system of claim 1 wherein the channel is configured in an inclined orientation.

9. In a method of making a cover system for an open top container or truck box, the system comprising a flexible cover having dimensions approximately the same as the open top, the flexible cover material having an upwardly facing surface and a downwardly facing surface, the flexible cover material having strips of a first fastening material disposed along at least a portion of two side edges of the downwardly facing surface, the open top container having strips of a second fastening material integrally formed with an elongated slat mounted on a side rail substantially at a top edge of a wall of the container or truck box, the first fastening material and the second fastening material being reversibly engageable with one another to fasten the cover to the open top, the improved method of manufacture comprising:

first, slideably introducing the elongated slat into the side rail so that it extends along the longitudinal axis of the side rail; and second, preventing slideable escape of the elongated slat from the rail, wherein the slideable escape is blocked by riveting the elongated slat to the side rail.

10. In a method of making a cover system for an open top container or truck box, the system comprising a flexible cover having dimensions approximately the same as the open top, the flexible cover material having an upwardly facing surface and a downwardly facing surface, the flexible cover material having strips of a first fastening material disposed along at least a portion of two side edges of the downwardly facing surface, the open top container having strips of a second fastening material integrally formed with an elongated slat mounted on a side rail substantially at a top edge of a wall of the container or truck box, the first fastening material and the second fastening material being reversibly engageable with one another to fasten the cover to the open top, the improved method of manufacture comprising:

first, slideably introducing the elongated slat into the side rail so that it extends along the longitudinal axis of the side rail; and second, preventing slideable escape of the elongated slat from the rail, wherein the slideable escape is prevented by a blocking member attached to the side of the rail, said blocking member projecting into a slot formed in the elongated slat.

11. The method of claim 10, further comprising the step of attaching an adjustable tension control assembly fixed in relationship to the side rail and in operative relation to a front edge of the flexible cover material.

12. A cover system for an open top container or truck box, the open top container or truck box having a front wall, a rear wall, and two side walls, the system comprising:

a side rail capable of being mounted adjacent a top edge of one of the side walls and defining a longitudinal channel therein;

a flexible cover material having an upwardly facing surface, a downwardly facing surface, a front edge, a rear edge and two side edges;

a first fastening means disposed along at least a portion of one of the side edges of the downwardly facing surface of the flexible cover material;

an elongated slat mounted within the channel to allow longitudinal sliding movement, the slat including an elongated slot formed through said slat;

a fastening surface on a surface of the elongated slat and exposed through the channel, wherein the fastening surface is capable of reversible attachment to the first fastening means; and at least one stop attached to the rail limiting the range the slat can slide longitudinally, and wherein the at least one stop attached to the side rail is configured to at least partially extend into the slot.

13. A cover system according to claim 12, wherein the at least one stop attached to the side rail comprises a roll pin removably inserted into a mating hole dimensioned to provide an interference fit to the roll pin and formed in the side rail.

14. A cover system according to claim 12, wherein the length of the slat is shorter than the channel and the at least one stop limits the longitudinal movement of the slat so that the ends of the slat do not exit the channel.

15. A cover system according to claim 12, wherein the at least one stop attached to the side rail further comprises a pair of end caps detachably attached to opposing ends of the side rail.

16. A cover system according to claim 12, wherein the first fastening means comprises strip of loop-bearing material permanently affixed to the flexible cover material, and wherein the fastening surface comprises a strip of hook-bearing material permanently affixed to the slat.

17. A cover system according to claim 12, wherein the first fastening means comprises a strip of hook-bearing material permanently affixed to the flexible cover material, and wherein the fastening surface comprises a strip of loop bearing material permanently affixed to the slat.

18. A cover system according to claim 12, wherein the side rail is extruded aluminum.

19. A cover system according to claim 18, wherein the channel defined in the side rail is outwardly facing when the side rail is mounted to the side wall.

20. A cover system according to claim 19, wherein the channel is inclined.

21. A cover system according to claim 12, wherein the side rail further comprises a mounting flange.

22. A cover system according to claim 21, wherein the mounting flange of the side rail is configured to be secured to the side wall by clamps.

23. A cover system according to claim 12, wherein the at least one stop is detachable from the rail.

24. A cover system according to claim 12, further comprising a plurality of elongated slats mounted within the channel to allow longitudinal sliding movement, and wherein the at least one stop limits the range the slats can slide within the channel.

25. A cover system according to claim 12, further comprising:

a second side rail capable of being mounted adjacent the other side wall and defining a longitudinal channel therein;

a second elongated slat mounted within the channel defined in the second side rail to allow longitudinal sliding movement;

a fastening surface on a surface of the second elongated slat and exposed through the channel defined in the second side rail, wherein the fastening surface of the second slat is capable of reversible attachment to the first fastening means and the first fastening means is disposed along at least a portion of both side edges of the downwardly facing surface of the flexible cover material; and at least one stop attached to the second side rail limiting the range the second slat can slide longitudinally.

26. A cover system according to claim 25, wherein the length of the first and second slats are shorter than the channels defined in the first and second side rails, respectively, and wherein the at least one stop attached to the first side rail and the at least one stop attached to the second side rail limits the longitudinal movement of the first and second slats so that the ends of the slats do not exit the channels.

27. The cover system of claim 12 further comprising an adjustable tension control assembly fixed in relationship to the side rail and in operative relation to a front edge of the flexible cover material.

28. The cover system of claim 12 wherein the cover can move relative to the rail after the first fastening means has engaged the second fastening means by an amount greater than or equal to 3/16 inches.

29. The cover system of claim 23 wherein the cover can move relative to the rail after the first fastening means has engaged the second fastening means by an amount less than or equal to 1 and ½ inches.

30. A cover system for an open top container or truck box, the open top container or truck box having a front wall, a rear wall, and two side walls, the system comprising:

a side rail capable of being mounted adjacent a top edge of one of the side walls and defining a longitudinal channel therein;

a flexible cover material having an upwardly facing surface, a downwardly facing surface, a front edge, a rear edge and two side edges;

a first fastening means disposed along at least a portion of one of the side edges of the downwardly facing surface of the flexible cover material;

an elongated slat mounted within the channel to allow longitudinal sliding movement, the length of the slat being shorter than the channel, and the slat further includes an elongated slot formed through said slat;

a fastening surface on a surface of the elongated slat and exposed through the channel, wherein the fastening surface is capable of reversible attachment to the first fastening means; and at least one stop attached to the rail limiting the range the slat can slide longitudinally wherein the at least one stop limits the longitudinal movement of the slat so that the ends of the slat do not exit the channel, and wherein the at least one stop attached to the side rail is configured to at least partially extend into the slot.

* * * * *